(12) United States Patent
Wang et al.

(10) Patent No.: US 12,443,474 B2
(45) Date of Patent: Oct. 14, 2025

(54) WEB PAGE ACCESS SYSTEM AND WEB PAGE ACCESS METHOD

(71) Applicant: Acer Incorporated, New Taipei (TW)

(72) Inventors: Chieh-Sheng Wang, New Taipei (TW); Wen-Cheng Hsu, New Taipei (TW); Shih-Hao Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 525 days.

(21) Appl. No.: 18/054,255

(22) Filed: Nov. 10, 2022

(65) Prior Publication Data

US 2023/0251919 A1    Aug. 10, 2023

(30) Foreign Application Priority Data

Feb. 8, 2022   (TW) ................................. 111104472
Feb. 8, 2022   (TW) ................................. 111104473

(51) Int. Cl.
| | |
|---|---|
| *G06F 9/54* | (2006.01) |
| *A63F 13/537* | (2014.01) |
| *G06F 3/0481* | (2022.01) |
| *G06F 3/0484* | (2022.01) |
| *G06F 9/451* | (2018.01) |

(52) U.S. Cl.
CPC ............ *G06F 9/547* (2013.01); *A63F 13/537* (2014.09); *G06F 3/0481* (2013.01); *G06F 3/0484* (2013.01); *G06F 9/451* (2018.02)

(58) Field of Classification Search
CPC ...... G06F 3/0484; G06F 3/0481; G06F 9/451; G06F 9/547; A63F 13/537
See application file for complete search history.

(56) References Cited

U.S. PATENT DOCUMENTS

| | | | |
|---|---|---|---|
| 9,087,438 B2 * | 7/2015 | Aponte | ................ G07F 17/3211 |
| 9,342,955 B2 * | 5/2016 | Weber | ................. G07F 17/3244 |
| 10,055,930 B2 * | 8/2018 | Ramos | ................ G07F 17/3244 |
| 10,908,893 B2 | 2/2021 | Lin | |

(Continued)

FOREIGN PATENT DOCUMENTS

| | | |
|---|---|---|
| CN | 109062475 A | 12/2018 |
| CN | 110555184 A | 12/2019 |

(Continued)

OTHER PUBLICATIONS

Chinese language office action dated Jul. 25, 2022, issued in application No. TW 111104473.

(Continued)

*Primary Examiner* — Reginald A Renwick
(74) *Attorney, Agent, or Firm* — McClure, Qualey & Rodack, LLP (57) ABSTRACT

A web page access method includes the following steps. A universal window platform interface receives a first command. The first command is transmitted to a server through a processor. Hardware is accessed or enabled by the server, according to the first command. A second command is received through an icon. The second command is transmitted to the server through the processor. The server accesses or enables the hardware according to the second command. The universal window platform interface and the game bar interface are constructed using a progressive web application.

8 Claims, 4 Drawing Sheets

(56) References Cited

U.S. PATENT DOCUMENTS

| | | | |
|---|---|---|---|
| 11,253,777 B2 | 2/2022 | Lin et al. | |
| 11,278,807 B2* | 3/2022 | Benedetto | A63F 13/35 |
| 11,636,734 B2* | 4/2023 | Lai | G07F 17/3255 |
| | | | 463/25 |
| 11,670,130 B2* | 6/2023 | Russ | G07F 17/3211 |
| | | | 463/25 |
| 11,900,765 B2* | 2/2024 | Petersen | G07F 17/3239 |
| 2010/0216544 A1* | 8/2010 | Hamlin | G07F 17/34 |
| | | | 463/30 |
| 2010/0240455 A1* | 9/2010 | Gagner | G07F 17/3227 |
| | | | 463/30 |
| 2013/0244761 A1* | 9/2013 | Agarwal | G07F 17/3286 |
| | | | 463/25 |
| 2016/0156957 A1* | 6/2016 | Yun | H04N 21/4415 |
| | | | 725/14 |
| 2016/0328092 A1* | 11/2016 | Bakos | G06F 8/38 |
| 2017/0087471 A1* | 3/2017 | Knutsson | A63F 13/35 |
| 2019/0129473 A1* | 5/2019 | Hu | G06F 3/0412 |
| 2021/0173549 A1* | 6/2021 | Song | A63F 13/537 |
| 2021/0352372 A1* | 11/2021 | Sun | H04N 21/4312 |
| 2022/0239985 A1* | 7/2022 | Kou | G06F 3/0482 |
| 2023/0124984 A1* | 4/2023 | Swanson | B42D 15/042 |
| | | | 235/494 |
| 2023/0276102 A1* | 8/2023 | Chen | G06T 7/70 |
| | | | 725/34 |

FOREIGN PATENT DOCUMENTS

| | | |
|---|---|---|
| TW | 201911020 A | 3/2019 |
| TW | 202115532 A | 4/2021 |
| TW | 202147101 A | 12/2021 |

OTHER PUBLICATIONS

Chinese language office action dated Oct. 31, 2022, issued in application No. TW 111104472.

\* cited by examiner

WEB PAGE ACCESS SYSTEM AND WEB PAGE ACCESS METHOD

CROSS REFERENCE TO RELATED APPLICATIONS

This application claims priority of Taiwan Patent Application No. 111104473, filed on Feb. 8, 2022, and Taiwan Patent Application No. 111104472, filed on Feb. 8, 2022, the entireties of which are incorporated by reference herein.

BACKGROUND OF THE INVENTION

Field of the Invention

The present disclosure relates to a progressive web application and, in particular, to a web page access system and a web page access method.

Description of the Related Art

Generally speaking, there are many types of gaming computers, and each has its own corresponding application program. Before these gaming computers leave the factory, it is necessary to provide the corresponding application programs for the gaming computer to the production line. These application programs are installed on the gaming computers on the production line before they are shipped, and this is a complicated process. For example, these applications can control various hardware operations (such as fan speed, processor performance, keyboard shortcut settings, etc.), or connect to web pages.

In addition, after shipping, if the content of an application needs to be updated, it may be necessary to use an over-the-air (OTA) method, which is prone to causing problems, such as transmitting poor signals, transmitting intermittent signals, taking a long time for downloading, transmitting discontinuous packets, etc.

Therefore, how to conveniently update or access the content provided by an application program on a computer has become one of the problems to be solved in the art.

BRIEF SUMMARY OF THE INVENTION

In accordance with one feature of the present invention, the present disclosure provides a web page access system. The web page access system includes a universal window platform interface and a game bar interface. The universal window platform interface is configured to receive a first command. The first command is transmitted to a server through a processor. The server accesses or enables hardware according to the first command. The game bar interface is configured to receive a second command through an icon. The second command is transmitted to the server through the processor. The server accesses or enables the hardware according to the second command. The universal window platform interface and the game bar interface are constructed using a progressive web application.

In one embodiment, the web page access system further includes a mobile application program interface. The mobile application program interface is installed on a mobile phone. The mobile application program interface is configured to receive a third command, and the third command is transmitted to the server through another processor. The server accesses or enables the hardware according to the third command. The mobile application program interface is constructed using the progressive web application program, and the other processor is located in the mobile phone.

In one embodiment, the universal window platform interface, the game bar interface, or the mobile application program interface is configured to open a browser. The universal window platform interface, the game bar interface, or the mobile application program interface is configured to obtain the web page that corresponds to the host model by opening the browser.

In one embodiment, when a host is running a game, the icon in the game bar interface is located on the game screen. The second command is received through the icon. The processor transmits the second command to the server. The server accesses or enables the hardware according to the second command.

In one embodiment, when the host is running a game, the processor receives a window switching command to switch the current game interface to the universal window platform interface, so as to receive the first command through the universal window platform interface. The first command is then sent to the server by the processor. The server accesses or enables the hardware according to the first command.

In accordance with one feature of the present invention, the present disclosure provides a web page access method. The web page access method includes the following actions. A first command is received by a universal window platform interface. The first command is transmitted to a server through a processor. The server accesses or enables the hardware according to the first command. A second command is received through an icon. The second command is transmitted to the server through the processor. The server accesses or enables the hardware according to the second command. The universal window platform interface and the game bar interface are constructed using a progressive web application.

In one embodiment, the web page access method further includes the following actions. A third command is received by a mobile application program interface. The third command is transmitted to the server through another processor. The server accesses or enables the hardware according to the third command. The mobile application program interface is constructed using the progressive web application program. The other processor is located in the mobile phone.

In this way, a lot of hardware devices can be controlled through the user interface of the progressive web page. The user interface of the progressive web page can also be connected to the web page to provide the user with more information or further operations. It is also possible to update the user interface and/or the webpage of the progressive web page in the backend. Therefore, the web page access system and web page access method do not need to use real-time online updates, providing a better way to access and update web pages, and to avoid using real-time online updates, which is prone to poor signals, intermittent connections, taking a long time to download, and discontinuous packets.

BRIEF DESCRIPTION OF THE DRAWINGS

In order to describe the manner in which the content recited above and other advantages and features of the disclosure can be obtained, a more particular description of the principles briefly described above will be rendered by reference to specific examples which are illustrated in the appended drawings. It should be understood that these drawings depict only example aspects of the disclosure and are not therefore to be considered to be limiting of its scope.

The principles herein are described and explained with additional specificity and detail through the use of the accompanying drawings, in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
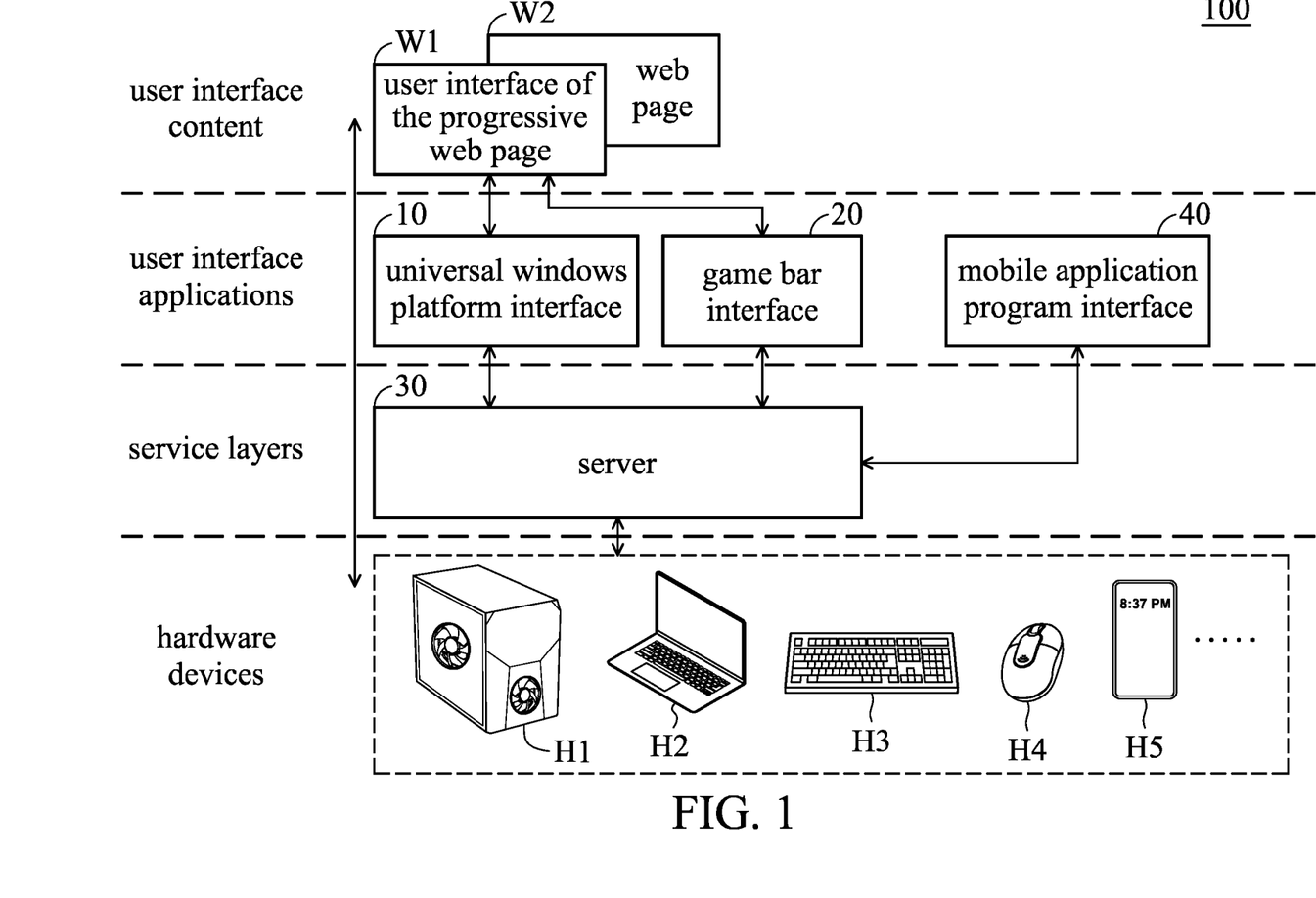
FIG. 1 is a block diagram of a web page access in accordance with one embodiment of the present disclosure.
Figure 2:
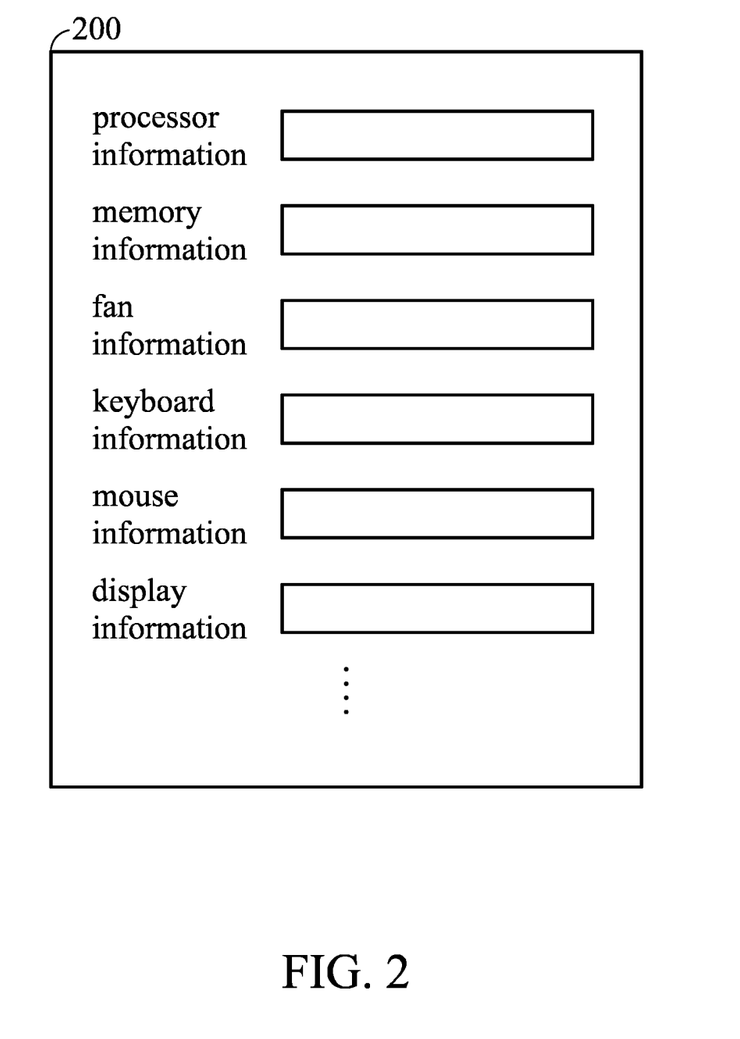
FIG. 2 is a schematic diagram of a window of universal window platform in accordance with one embodiment of the present disclosure.
Figure 3:
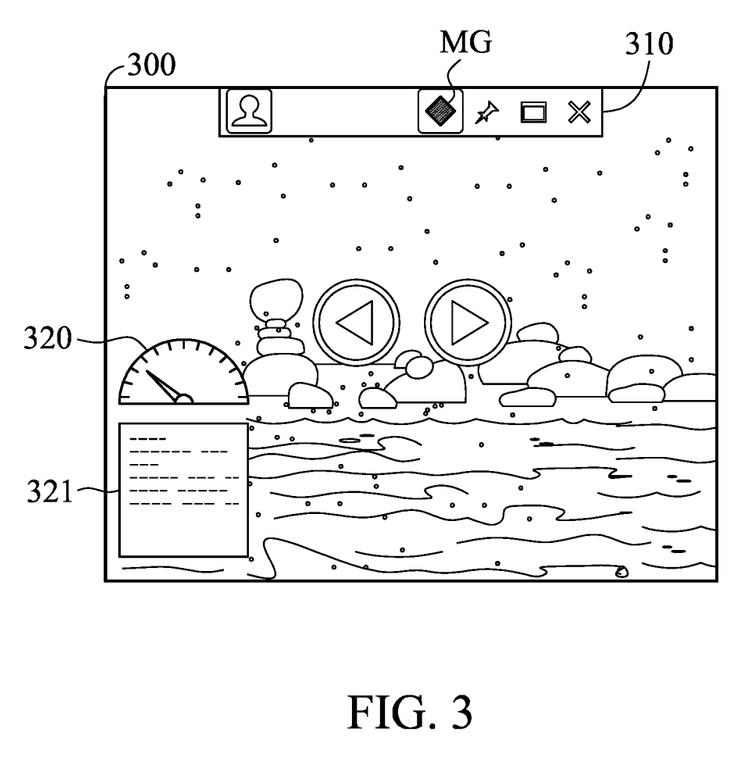
FIG. 3 is a schematic diagram of a game bar interface in accordance with one embodiment of the present disclosure.
Figure 4:
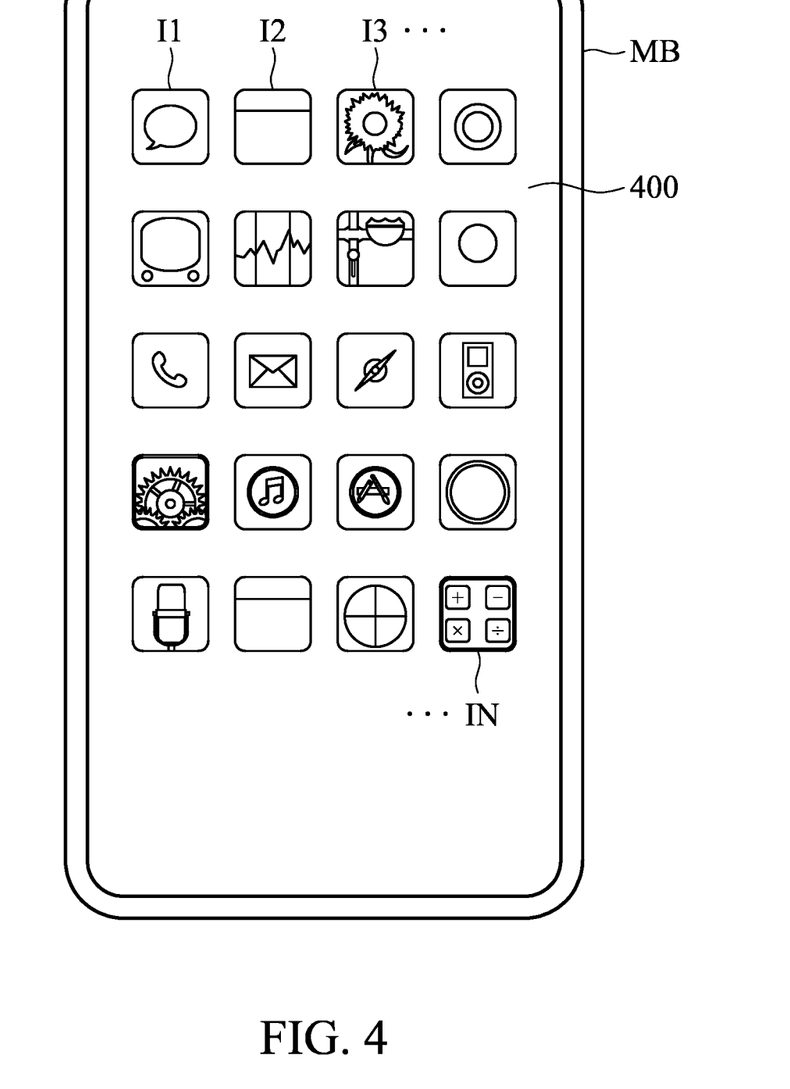
FIG. 4 is a schematic diagram of a mobile application program interface 400 in accordance with one embodiment of the present disclosure.

Refer to FIG. 1 to FIG. 4, FIG. 1 is a block diagram of a web page access 100 in accordance with one embodiment of the present disclosure. FIG. 2 is a schematic diagram of a window 200 of universal window platform in accordance with one embodiment of the present disclosure. FIG. 3 is a schematic diagram of a game bar interface 300 in accordance with one embodiment of the present disclosure. FIG. 4 is a schematic diagram of a mobile application program interface 400 in accordance with one embodiment of the present disclosure.

As shown in FIG. 1, the web page access system 100 includes a Universal Windows Platform interface 10 and a game bar interface 20.

In one embodiment, the web access system 100 can be divided into user interface content, user interface applications, service layers, and hardware devices.

In one embodiment, the user interface application program of the web page access system 100 includes a universal window platform interface 10 and a game bar interface 20.

In one embodiment, the user interface application programs of the web page access system 100 include a universal window platform interface 10, a game bar interface 20 and a mobile application program interface 40.

In one embodiment, the server 30 is configured to be an interface between the hardware device and user interface application programs (universal window platform interface 10, game bar interface 20 and a mobile application program interface 40). In other words, the server 30 can receive commands from the universal window platform interface 10, the game bar interface 20 and a mobile application program interface 40, and transmit the commands to the corresponding hardware devices to adjust or access the hardware devices.

In one embodiment, the server 30, the universal window platform interface 10, the game bar interface 20 and a mobile application program interface 40 may each be implemented by software, firmware or hardware.

In one embodiment, when a host (such as a gaming computer host) is running a game, the processor receives a window switching command to switch the current game interface to the universal window platform interface 10, so as to receive the first command through the universal window platform interface 10. Then, the first command is sent to the server 30 by the processor, and the server 30 accesses or enables the hardware according to the first command.

In one embodiment, as shown in FIG. 2, the window 200 of the universal window platform interface includes processor information, memory information, fan information, keyboard information, mouse information, display information, etc. The user can adjust various hardware performances through the window 200 of the universal window platform interface.

In one embodiment, the universal window platform interface 10 receives a command (e.g., receives a command input by the user through the window 200 of the universal window platform interface), and transmits the command to a server 30 through a processor. The server 30 is configured to access or enable hardware (e.g., at least one of the hardware H1 to H5 in the hardware device) according to the first command. In one embodiment, the processor may be located in a currently used hardware device. Or, the processor may be a processor to which each component of the entire web page access system 100 is connected. The commands are, for example, adjusting processor performance, releasing memory, adjusting fan speed, adding a mouse, adjusting display resolution, etc., but not limited thereto.

In one embodiment, the hardware H1 is, for example, a gaming computer (or host), a general computer host, or a server. For example, the hardware H2 is a laptop. For example, the hardware H3 is a keyboard. For example, the hardware H4 is a mouse. For example, the hardware H5 is a mobile phone.

In one embodiment, the server 30 can receive commands from the windows platform interface 10, the game bar interface 20 and/or the mobile application program interface 40 to control the fan speed, processor performance, memory management, graphics processor performance and/or display resolution; fan speed, processor performance, memory management, graphics processor performance and/or display resolution of hardware H2; addition, removal, lighting (enable light, turn off light or adjust light color) and/or expansion of hardware H3; addition, removal, lighting (enable light, turn off light or adjust light color) and/or expansion of hardware H4; processor performance, memory management, graphics processor performance and/or display resolution of hardware H5 . . . etc. This is an example, the server 30 can access or set the performance, turn on or turn off of various components in each hardware H1 to H5, but is not limited to this.

In one embodiment, when the user is not playing the game, the window 200 of the universal window platform interface can be opened through the universal window platform interface 10 to adjust the hardware. In one embodiment, when the user is playing the game, the user can first switch to the window 200 of the universal window platform interface to adjust the hardware.

In one embodiment, when a host (such as a gamming computer host) is running a game, the icon MG in the game bar interface 20 is located in the game screen, the processor receives commands through icon MG and transmits the commands to the server. The server is configured to access or enable hardware (e.g., at least one of the hardware H1 to H5 of the hardware devices) according to the commands.

In one embodiment, as shown in FIG. 3, the game bar interface 300 is used to directly pin an icon MG on the setting interface 310 of a game interface. The setting interface 310 is, for example, Microsoft's MSFT Gamebar. The setting interface 310 includes, for example, processor information, memory information, fan information, keyboard information, mouse information, display information, and the like. In the game, the user can directly open the control windows 320-321 in the game by clicking on icon MG to adjust various hardware performances.

In one embodiment, the content of the control windows 320-321 may be placed in the backend of the user interface W1 (or web page) of the progressive web page.

In this way, when the contents of the control windows 320-321 need to be modified, they can be modified directly through the background, the icon and other interfaces do not need to be changed, and the user does not need to switch windows during the game, the user only needs to click the icon MG. That is, the user can see the contents of the new windows 320-321.

In one embodiment, the game bar interface 300 is configured to receive a command through an icon MG. The processor transmits the command to the server 30. The server 30 is configured to access or enable hardware (e.g., at least one of the hardware H1 to H5 in the hardware device) according to the command. The commands are, for example, adjusting processor performance, releasing memory, adjusting fan speed, adding a mouse, adjusting display resolution, etc., but not limited thereto.

In one embodiment, as shown in FIG. 4, the mobile application program interface 400 is installed on a mobile phone MB. The mobile application program interface 400 receives a commend, and transmit the commend to the server through the processor of the mobile phone MB, and the server accesses or enables the hardware according to the commend. The mobile application program interface 400 is constructed using the progressive web application program, and the processor is located in the mobile phone MB.

In one embodiment, in the mobile application program interface 400, icons I1-I3 are icons of native applications. Icon IN is an icon of web application, that is, icon IN is built by a progressive web application. When icon IN is clicked, the browser will be opened, and the pre-configured web page will be displayed in the browser. Similar concepts can also be applied to the desktops of laptops and desktops, and are presented as application shortcut icons. When the icon of the application shortcut is clicked, the preset web page will be opened.

In one embodiment, the user can control the hardware through the mobile application program interface 400, such as adjusting the fan speed to the highest, regardless of whether the user is playing a game or not.

In one embodiment, the universal window platform interface 10, the game bar interface 20, and the mobile application program interface 40 are constructed using a progressive web application. A progressive web application is a web application built on a normal web page or website, presented as a traditional application or a native mobile application, such as an application shortcut icon on a laptop or desktop or an icon on a mobile MB. Progressive web applications combine the features offered by the most modern browsers with the advantages of a mobile device experience. For example, a website that is frequently accessed by users can be displayed on the mobile phone MB as an icon through the function of progressive web application, which looks like the appearance of an application. When this icon is clicked, this icon will trigger the processor to open the browser and lead to this website. This enables users to open the web page intuitively and quickly.

Therefore, the web page access method implanted by the web page access system can receive a first command through a universal window platform interface 10, and transmit the first command to a server 30 through a processor. The server 30 accesses or enables hardware according to the first command. And/or, the web page access method implanted by the web page access system can use a game bar interface 20 to receive a second command through an icon, and transmit the second command to the server 30 through the processor. The server 30 accesses or enables hardware according to the second command. The universal window platform interface 10 and the game bar interface 20 are constructed using a progressive web application program. The first command and the second command may be the same or different commands. The first command and the second command may control the same or different hardware.

In one embodiment, the universal window platform interface 10, the game bar interface 20 or the mobile application program interface 40 are used to open a browser. Through the universal window platform interface 10, game bar interface 20 or mobile application program interface 40, a web page corresponding to a host model can be obtained by opening the browser.

In one embodiment, please refer to FIG. 1 again, after the universal window platform interface 10, game bar interface e20 and mobile application program interface 40 built by the progressive web application are selected, a browser can be opened. This browser can open the user interface W1 of the progressive web page. The user interface W1 of the progressive web page can be connected to other web page W2. The web page W2 provides web page content (such as hardware adjustment interface or simple web page content). The web page W2 supports web page rendering of 3D objects (such as dragging a laptop with a mouse to see the appearance of the laptop from various perspectives) and/or supports WebXR. WebXR is an application programming interface (API), which can support virtual reality or augmented reality. Therefore, when the mobile application program interface 40 opens the browser through the icon IN, and the browser supports WebXR, the browser of the mobile phone MB can use the augmented reality to present the object in a specific position. For example, the appearance of the virtual notebook is applied to augmented reality, and the virtual notebook is presented on a physical table through the display of the mobile phone MB. Thus, the user can see the appearance of placing the laptop on the physical table through the display of the mobile phone MB.

In one embodiment, the web page W2 to which the mobile application program interface 40 of the Microsoft mobile phone is connected can be the Windows Store. The web page W2 to which the mobile application program interface 40 of the Android phone is connected can be the Google Play. The web page W2 to which the mobile application program interface 40 of the iPhone is connected can be the Apple Store. However, the images that can be opened by the web page W2 are not limited thereto.

In one embodiment, the universal window platform interface 10, the game bar interface 20 and the mobile application program interface 40 built by the progressive web application program can obtain a web page W2 corresponding to a host model by opening a browser or the user interface W1 of the progressive web page.

In one embodiment, the web address of the web page W2 or the user interface W1 of the progressive web page is preset as a web address corresponding to the host model at the factory. For example, the host model PH517-52 corresponds to the URL "https://www.PredatorSense.com/PH517-52", the host model PH517-53 corresponds to the website "https://www.PredatorSense.com/PH517-53", the host model AN515-57 corresponds to the website "https://www.NitroSense.com/AN515-57". The host models PH517-52 and PH517-53 are gaming computers, and the host model AN515-57 is a general computer. This is just an example, and the host model and corresponding URL are not limited thereto.

In one embodiment, if the user changes the web address corresponding to the gaming computer of the host model PH517-52 to the web address corresponding to the host model PH517-53, the gaming computer of the host model PH517-52 can still see the content or icon of "https://www.PredatorSense.com/PH517-53", but it is not possible to adjust the hardware of the gaming computer with the host model PH517-52 through this website. For example, the gaming computer with host model PH517-52 cannot control the fan speed through the content or icon of "https://www.PredatorSense.com/PH517-53".

In one embodiment, the universal window platform interface 10, the game bar interface 20 and the mobile application program interface 40 built by the progressive web application program each have a corresponding URL. Taking the gaming computer of the host model PH517-52 as an example, when the game is in progress, the game bar interface 20 of the gaming computer with the host model PH517-52 is connected to the uniform resource locator (URL) of "https://www.PredatorSense.com/PH517-52/Gamebar/Online", when the game is not in progress, the game bar interface 20 of the gaming computer of the host model PH517-52 is connected to URL as "https://www.PredatorSense.com/PH517-52/Gamebar/Offline"; when the game is in progress, the universal window platform interface 10 of the gaming computer with the host model PH517-52 is connected to the URL of "https://www.PredatorSense.com/PH517-52/UWP/Online", when the game is not in progress, the universal window platform interface 10 of the gaming computer with the host model PH517-52 is connected to the URL of "https://www.PredatorSense.com/PH517-52/UWP/Offline"; when the game is in progress, the mobile application program interface 40 of the gaming computer with the host model PH517-52 is connected to the URL of "https://www.PredatorSense.com/PH517-52/Phone/Online", when the game is not in progress, the mobile application program interface 40 of the gaming computer with the host model PH517-52 is connected to the URL of "https://www.PredatorSense.com/PH517-52/Phone/Offline". This is just an example, and the host model and corresponding URL are not limited thereto.

Therefore, the gaming computer of the host model PH517-52 can be connected to the website corresponding to the current usage scenario through various user interfaces (e.g., universal window platform interface 10, game bar interface 20 and mobile application program interface 40) in different usage scenarios. When the content of these URLs needs to be updated, as long as the content of the user interface W1 of the progressive page is updated in the backend, for example, through the web page to adjust the performance or enabled hardware, through updating the webpage W2 to update the 2D or 3D products displayed on the web page W2, through the web page to display the new device and adjust the new device (such as adding a slide mouse, adjusting the lighting of the mouse through the web page) . . . etc.

In this way, a lot of hardware devices can be controlled through the user interface W1 of the progressive web page. The user interface W1 of the progressive web page can also be connected to the web page W2 to provide the user with more information or further operations. It is also possible to update the user interface W1 and/or the webpage W2 of the progressive web page in the backend. Therefore, the web page access system and web page access method do not need to use real-time online update, providing a better way to access and update web pages, and avoid using real-time online update to update, which is prone to poor signal, intermittent, taking a long time to download, discontinuous packets . . . etc.

The methods of the present invention, or specific versions or portions thereof, may exist in the form of code. The code may be contained in physical media, such as floppy disks, optical discs, hard disks, or any other machine-readable (such as computer-readable) storage media, or not limited to external forms of computer program products. When the code is loaded and executed by a machine, such as a computer, the machine becomes a device for participating in the present invention. The code may also be transmitted through some transmission medium, such as wire or cable, optical fiber, or any type of transmission, wherein when the code is received, loaded and executed by a machine, such as a computer, the machine becomes a device for participating in the present invention. When implemented on a general-purpose processing unit, the code combines with the processing unit to provide a unique device that operates similarly to application-specific logic circuits.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A web page access system, comprising:
   a universal window platform interface, configured to receive a first command; wherein the first command is transmitted to a server through a processor; wherein the server accesses or enables hardware according to the first command;
   a game bar interface, configured to receive a second command through an icon; wherein the second command is transmitted to the server through the processor; wherein the server accesses or enables the hardware according to the second command; and
   wherein the universal window platform interface and the game bar interface are constructed using a progressive web application;

a mobile application program interface, installed on a mobile phone; wherein the mobile application program interface is configured to receive a third command, and the third command is transmitted to the server through another processor, and the server accesses or enables the hardware according to the third command;

wherein the mobile application program interface is constructed using the progressive web application program, and the other processor is located in the mobile phone.

2. The web page access system of claim 1, wherein the universal window platform interface, the game bar interface or the mobile application program interface is configured to open a browser;

wherein the universal window platform interface, the game bar interface or the mobile application program interface is configured to obtain a web page corresponding to a host model by opening the browser.

3. The web page access system of claim 1, wherein when a host is running a game, the icon in the game bar interface is located on a game screen, the second command is received through the icon, the processor transmits the second command to the server, and the server accesses or enables the hardware according to the second command.

4. The web page access system of claim 1, wherein when a host is running a game, the processor receives a window switching command to switch a current game interface to the universal window platform interface, so as to receive the first command through the universal window platform interface, and then the first command is sent to the server by the processor, and the server accesses or enables the hardware according to the first command.

5. A web page access method, comprising:

receiving a first command via a universal window platform interface, and transmitting the first command to a server through a processor; accessing or enabling hardware using the server according to the first command;

receiving a second command through an icon; wherein the second command is transmitted to the server through the processor; wherein the server accesses or enables the hardware according to the second command; and wherein the universal window platform interface and the game bar interface are constructed using a progressive web application;

receiving a third command via a mobile application program interface, and the third command is transmitted to the server through another processor, and the server accesses or enables the hardware according to the third command;

wherein the mobile application program interface is constructed using the progressive web application program, and the other processor is located in the mobile phone.

6. The web page access method of claim 5, wherein the universal window platform interface, the game bar interface or the mobile application program interface is configured to open a browser;

wherein the universal window platform interface, the game bar interface or the mobile application program interface is configured to obtain a web page corresponding to a host model by opening the browser.

7. The web page access method of claim 5, wherein when a host is running a game, the icon in the game bar interface is located on the game screen, the second command is received through the icon, the processor transmits the second command to the server, and the server accesses or enables the hardware according to the second command.

8. The web page access method of claim 5, wherein when a host is running a game, the processor receives a window switching command to switch the current game interface to the universal window platform interface, so as to receive the first command through the universal window platform interface, and then the first command is sent to the server by the processor, and the server accesses or enables the hardware according to the first command.

* * * * *